United States Patent [19]
Shanbrom

[11] Patent Number: 6,036,738
[45] Date of Patent: *Mar. 14, 2000

[54] DISINFECTING GAS FILTERS

[75] Inventor: Edward Shanbrom, Santa Ana, Calif.

[73] Assignee: Shanbrom Technologies LLC, Ojai, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/001,341

[22] Filed: Dec. 31, 1997

[51] Int. Cl.[7] .................................................. B03C 3/32
[52] U.S. Cl. ............................ 55/524; 96/58; 96/63; 96/66; 96/69; 55/DIG. 2; 55/DIG. 35
[58] Field of Search .................. 96/58, 63, 66, 96/69; 55/387, 524, DIG. 2, DIG. 35; 422/120; 424/404

[56] References Cited

U.S. PATENT DOCUMENTS

| | | | |
|---|---|---|---|
| 3,693,327 | 9/1972 | Scheinberg | 55/387 |
| 5,015,451 | 5/1991 | Holter et al. | 55/524 |
| 5,667,564 | 9/1997 | Weinberg | 96/58 |
| 5,744,150 | 4/1998 | Lercone | 424/404 |
| 5,814,135 | 9/1998 | Weinberg | 96/58 |

*Primary Examiner*—David A. Simmons
*Assistant Examiner*—Minh-Chau T. Pham
*Attorney, Agent, or Firm*—Stefan J. Kirchanski, Esq.; Graham & James LLP

[57] ABSTRACT

An improved disinfecting air filter that can be used to disinfect air or other gases. The invention can be advantageously used as a standalone to control microorganisms or used with a traditional HEPA filter to effectively control all microorganisms as well as dust particles. The device contains an iodine-donating filter disposed to dispense an effective quantity of iodine vapor into the gas or air stream to be filtered. The iodine laden air then passes through a porous filter of polyvinyl acetal polymer which material has an unusual affinity for iodine and effectively removes it leaving disinfected and iodine-free air or gas.

20 Claims, 2 Drawing Sheets

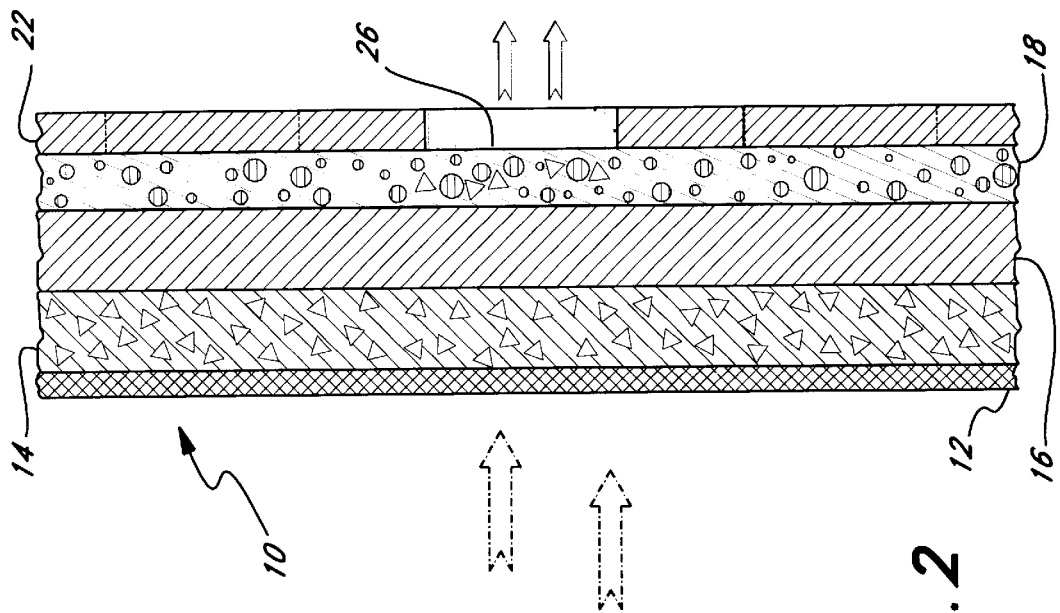
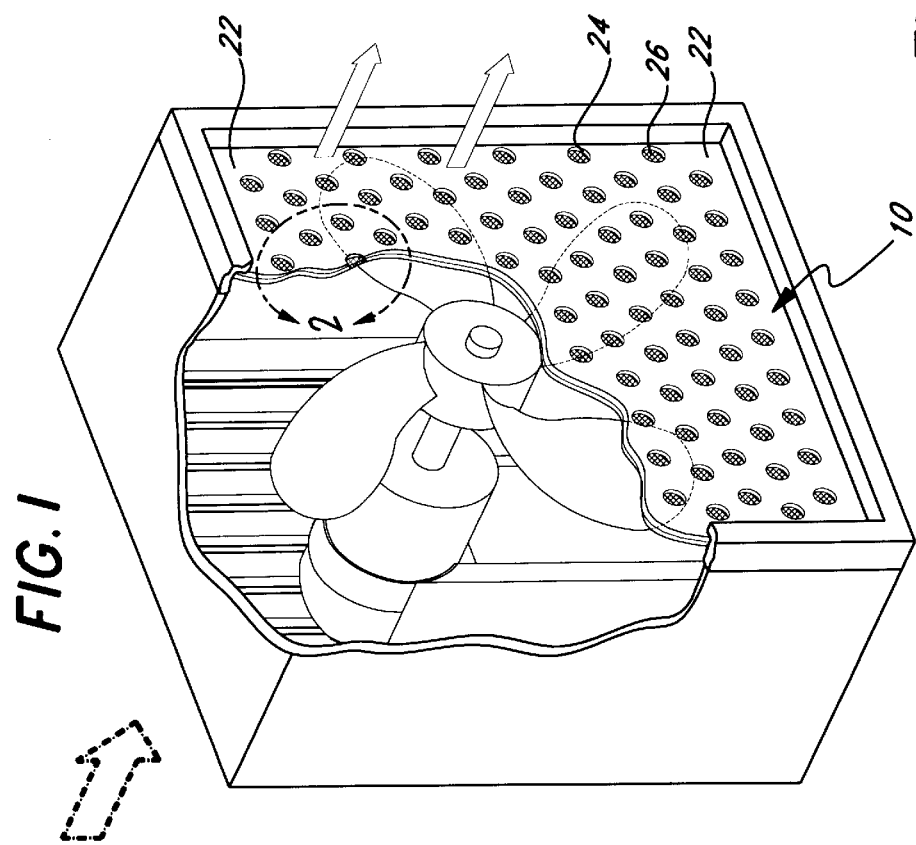

DISINFECTING GAS FILTERS

BACKGROUND OF THE INVENTION

1. Field of the Invention

The present invention relates generally to materials and methods for the purification of gases and more specifically to an improved filter for removing and/or inactivating microorganisms in air or other gas.

2. Description of Related Art

It is common knowledge that air is generally replete with microorganisms some of which may cause human disease. The art of removing and/or destroying these infectious agents is well developed because such agents are of considerable economic importance. One obvious venue is that of medicine where the need for sterility particularly during surgical operations is well known. Less obvious, perhaps, is the need to control microorganisms and pathogens in the food industry. Not only can diseases be spread by food, accidental introduction of microorganisms leads to premature food spoilage with concomitant economic loss. Further many food products such as cheeses or wines are not sterile but, rather, are the products of microbial action. In these instances the introduction of an inappropriate microorganism will result in significant or total loss of quality. Microorganisms are also present in household dust so that the very act of "cleaning" may actually result in damage because microorganisms become inappropriately distributed.

A number of different filtration and purification technologies have been developed to deal with these and related problems. Filtration is the simplest and often the most effective. Bacteria and similar pathogens have a finite size (usually at least 1 $\mu$m in their smallest dimension) and can be trapped by a filter with sufficiently small pores. The most common filter that is effective at stopping such small particles is a HEPA or High Efficiency Particle Arresting filter. These filters are often made of packed glass fibers and are effective at stopping particles greater than 1 $\mu$m. However, they are less effective at stopping smaller particles and virtually ineffective at stopping particles in the size range of viruses (0.001 to 0.05 $\mu$m). A further problem with HEPA filters is that they act as concentrating areas and breeding zones for microorganisms so that the filter may actually begin to add microorganisms to the filtered air.

One possible solution to this problem is to add some type of disinfectant to a HEPA filter to destroy microorganisms as they are deposited on the filter. Such a disinfectant might also inactivate viruses as they pass through the filter. The disinfectant can be either physical or chemical. For example, a very effective disinfection is achieved by heating the air to a high temperature to effectively "pasteurize" it. While such a method can be highly effective, it requires a fairly complex mechanism that consumes an inordinate amount of energy: first to heat the air; and then to cool it back to ambient temperature.

Ultraviolet light is also a very effective disinfectant and is the basis for a variety of germicidal systems. Typical of disinfectant air filtration systems is that disclosed in U.S. Pat. No. 5,523,057. In that disclosure a first filter is used to remove some particulates from air. Then an ultraviolet source is used to destroy microorganisms. Finally a carbon filter is used to remove "chemical vapors." An effective ultraviolet source generates considerable ozone which can be objectionable and must be removed by a carbon or other filters or catalysts. An electric discharge can also be used to generate disinfecting concentrations of ozone. At the same time such a discharge can be part of an eletroprecipitating filter that removes larger particulates. Again, a chemical filter may be necessary to remove excess ozone. However, the main drawbacks of an ultraviolet or electric discharge-based system is probably the size, cost and complexity of the devices.

A possible alternative is to employ a chemical disinfection system, such as the addition of a germicide to the HEPA or other filter material to prevent multiplication of trapped microorganisms. While a considerable number of such germicides are available to prevent multiplication of microorganisms, few if any are able to rapidly kill bacteria and viruses. U.S. Pat. No. 5,141,722 discloses a system that combines ozone with chlorine dioxide to effect total destruction of microorganisms. However, this chemical combination is very toxic and requires a special absorbent. Similarly, it is known that iodine is an effective disinfecting agent that might be used in air filters. However, a significant problem remains with removing the iodine vapors following the disinfection process since iodine is irritating and has a fairly distinct and somewhat unpleasant odor. Again, a typical solution is a carbon filter, but this is messy and adds considerable bulk to the filtration system.

SUMMARY OF THE INVENTION

The current invention is an improved disinfecting gas filter. The device can be advantageously used with a traditional HEPA filter to effectively control microorganisms as well as dust particles. The device can be used as a standalone to control microorganisms. The device comprises an iodine-donating filter disposed to dispense an effective quantity of iodine vapor into the air stream to be filtered. The iodine laden air then passes through a porous iodine-absorbing filter such as one of polyvinyl acetal polymer which material has an unusual affinity for iodine and effectively removes it from the air leaving disinfected and iodine-free air.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 shows a device using a filter of the present invention;

FIG. 2 shows a diagrammatic cross-section of the present invention configured as a disinfecting filter for use in an air purification device or in a central building ventilation system;

DETAILED DESCRIPTION OF THE PREFERRED EMBODIMENTS

Figure 3:
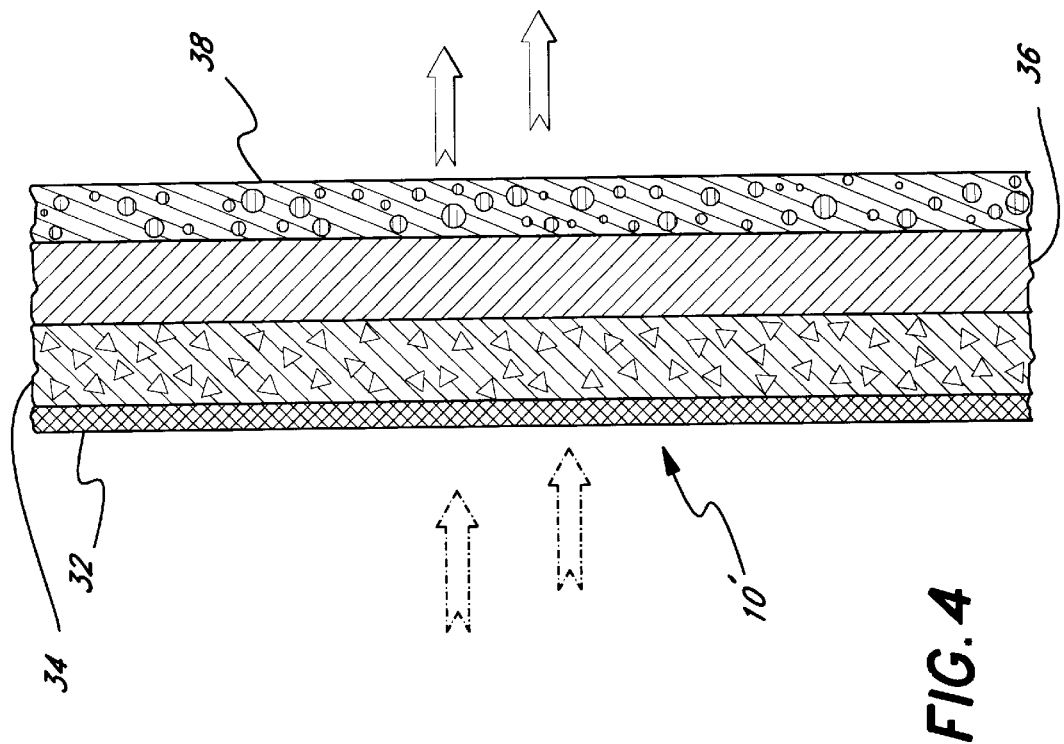
FIG. 3 shows a diagrammatic representation of the present invention configured as a vacuum cleaner bag.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a simple disinfecting air filter.

The present invention consists essentially of two components: the first component is an iodine source and may be any of a number of porous substrates impregnated with elemental iodine or some other iodine vapor source intended to act as an iodine-donating material; the second component is an iodine trap consisting of gas permeable polyvinyl acetal polymer (PVAcetal) or a layer of anion exchange resin (such as derivatized styrene, DEAE cellulose, DEAE cross-linked dextran polymer (Sephadex, Amersham-Pharmacia Biotech) or ion exchange agarose). Appropriate iodine sources are easy to create since elemental iodine has a comparatively high vapor pressure and a significant quantity of it will vaporize at room temperature.

If traditional air filtering material such as a glass fiber-based HEPA filter is treated with elemental iodine, it will readily iodinate any air or other gas passing through. The iodine can be applied by immersing the filter in a sufficiently concentrated iodine solution and then drying the filter before use. Although it is possible to make an aqueous iodine solution (iodine/iodide), for filter impregnation an iodine solution based on an organic solvent may be advantageous because such solvents generally evaporate more readily than water. Alcoholic solutions are generally preferred because ethanol is relatively nontoxic so that small traces of solvent left in the filter is of little consequence. Alternatively, chlorinated solvents like chloroform and methylene chloride may be used but precautions must be taken to ensure that no chlorinated solvent remains in the iodinating material. Another way of creating the iodinating material is to disperse elemental iodine through the material either as a fine powder or by sublimation of iodine, possibly at a temperature at or above room temperature (25° C.).

If a HEPA material is used to dispense iodine, that material will serve a double function of particle removal and air iodination. Less effective filters such as paper (cellulose) or porous urethane sponges or other sponges may be used as substrates for the iodinating material, but in that case it is generally important to have a layer of effective particulate trapping material somewhere in the filter since a simple paper layer could become easily clogged resulting in premature failure of the filter. If the HEPA or other particle trap is placed before the iodinating material, it may become filled with microorganisms and act as a germ breeding ground. The iodinating material, however, will prevent any of these microorganisms from becoming resuspended in the air. Nevertheless, it is probably preferable to place the major particulate trapping layers after the iodinating material to prevent any growth of microorganisms thereon. With this configuration it is advantageous to protect the iodinating material with a minor particulate filter to keep the user from directly contacting the iodinating material and to prevent the iodinating material from becoming clogged by excessive air-borne particulates. It will be appreciated that these concerns primarily influence the length of the effective life of the filter of the present invention. If the filter is employed in a disposable situation (such as a face mask) and is expected to be used only once and then but briefly, prefilters and the like can be dispensed with.

The preferred iodine trap is composed of PVAcetal. This material is produced by reacting vinyl alcohol with formaldehyde. Depending on the exact physical properties desired other monomers such as vinyl acetate may also be included so that an alternate name for this material is polyvinyl acetate-acetal copolymer. Prior to polymerization the material is treated so as to form a porous sponge following complete polymerization. The material may be emulsified (whipped) with air or other gas so that the tiny gas bubbles so formed create the porous matrix. Alternatively, salt, starch or some other solid may be mixed in and then dissolved away following polymerization, thereby creating the pores through which air passes when the material is used in the present invention. PVAcetal materials are widely used as sponges in medicine and for various cleaning and processing methods; the precise details of their manufacture is beyond the scope of the present invention.

It is known that iodine in solution can be made to bind to PVAcetal. In fact, there has been some use of PVAcetal, as an iodine dispensing material. Potentially, it could be used as an iodinating source material in the present invention if it can be readily obtained having a sufficient iodine concentration. Although the reaction of PVAcetal with iodine in solution is known, the ability of PVAcetal to effectively trap gaseous iodine is a new discovery by the present inventor. Since PVAcetal has been touted as an iodine releaser, it is somewhat surprising that it can actually function as an effective trap for gaseous iodine. Further, while reaction of iodine in solution with a number or iodophors (iodine complexing agents) is known, it was not previously known that effective iodine complexing can occur in the vapor phase as well.

All that is necessary is to choose a PVAcetal material that is sufficiently porous to readily pass the air or gas being treated while at the same time providing sufficient exposed surface area to adequately remove the iodine vapor. That is, a very thin layer of coarsely porous PVAcetal will be inadequate for the present invention because considerable air will pass through without actually contacting the PVAcetal. Alternatively, an extremely dense PVAcetal may not be suitable because of the excessive energy needed to force gas through the material. In fact, some such materials may be essentially impermeable to gas. Although various analytic methods can be used to select the proper configuration of the iodine trap, i.e., by testing the air output to ensure that no iodine is present, the human nose is sufficiently sensitive to iodine that proper configuration of the iodine trap can be achieved without recourse to complex equipment.

While PVAcetal is presently the preferred iodine-absorbing material, it is also possible to obtain effective iodine removal with any of a number of ion exchange materials or resins as is detailed above. The primary problem with these materials is that they are not quite as easily fashioned into a filter as are PVAcetal materials.

FIG. 1 shows a diagrammatic air filter device. FIG. 2 shows a cross-section of the present invention configured as a disinfecting filter for use in an air purification device of FIG. 1 or in a central building ventilation system. This device can replace typical furnace filters because it is not so resistant to air flow (like some HEPA filters) as to require specialized blowers. A first outer layer 12 of the filter 10 consists of nonwoven glass or other fibers, and while presenting relatively little resistance to air flow acts to effectively remove larger dust and similar particles. Following the outer layer 12 is an iodine source 14. This represents a layer of glass or other fibers impregnated with iodine as explained above. Again, while this layer may effectively remove considerable particulates, its main purpose is one of iodinating the air as it passes through. Following the iodine source 14 is a particle trapping layer 16 comprised of glass or other fibers traditionally used in air filters. This layer will remove essentially all of the dust particles and particles in the bacterial size range. Because of the iodine emitted by the source layer 14 none of the microorganisms trapped on the trapping layer 16 remain viable so there is no danger of microorganism multiplication. Although some bacterial and fungal spores are resistant to iodine, they eventually succumb to continuous iodine exposure. Although common trapping materials cannot effectively remove most particles of viral dimensions, the iodine effectively denatures and inactivates the viral particles so that any that pass through the filter are harmless.

Beyond the particulate trapping layer 16 lies a layer of porous PVAcetal 18 which acts as an iodine trap. As the iodine trap 18 removes iodine from the passing air, an iodine front forms in the material and slowly migrates through as more and more iodine is captured. As the colorless or white PVAcetal captures iodine, it rapidly darkens, first to a red-brown and finally to a blue-black color. This color change and possibly the efficiency of iodine capture is influenced by the humidity of the filtered air. The inventor has discovered that the iodine capture process can be potentiated by the application of a small amount of a humidifying substance such as glycerol, ethylene glycol, propylene glycol or liquid polyethylene glycol to the iodine trap 18 during manufacture. This can be achieved by rinsing the layer with a 1–5% solution of the humidifying substance prior to assembling the device 10.

The importance of the color change reaction is that it indicates when the iodine trap 18 has become saturated, and the filter needs replacement. For example, examination of the exit side of the device 10 will indicate exhaustion of the trapping layer 18 as a pronounced darkening of the surface of that layer. This determination can be aided by a thin but opaque layer 22 of white nonwoven material with small (about 1 mm diameter) indicating holes 26. The white layer 22 does not change color, but as the iodine trap 18, seen through the holes 26, darkens, the change is obvious when contrasted to the white material 22. A series of indicator colors (not shown) can be advantageously printed on the white material 22 to be compared to the color observed in the indicating holes 26 to help the user decide when the filter device 10 should be replaced.

Figure 4:
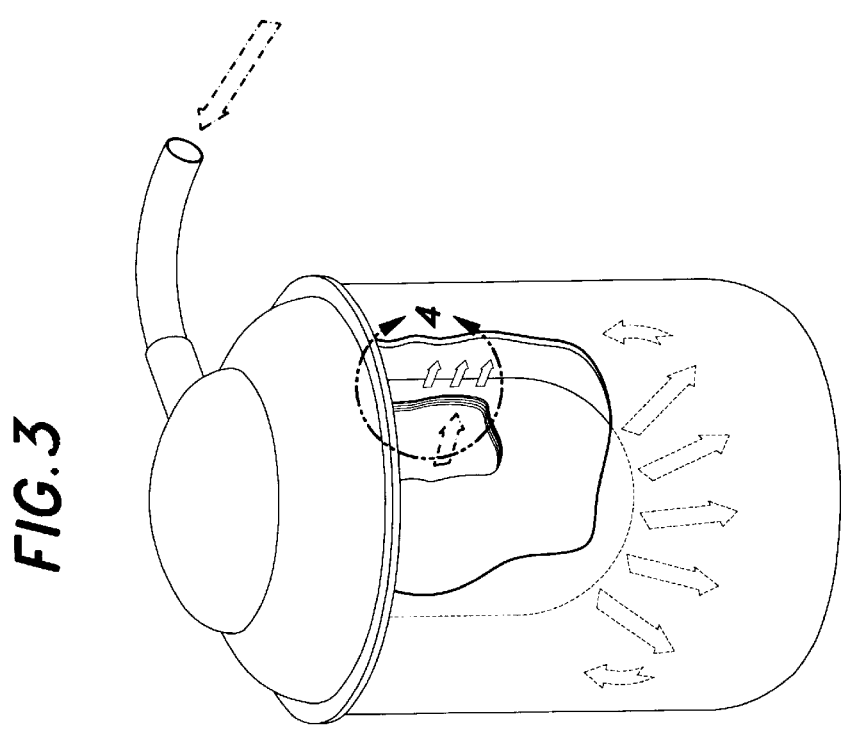
FIG. 4 shows a cross-section of the vacuum cleaner bag of FIG. 3.

Up until now the present invention has been discussed as a typical air filter, but it is also useful in other air moving situations such as those found in a vacuum cleaner, humidifiers, vaporizers or air exchangers. Vacuum cleaners are already available with HEPA filters but this usually requires a specialized machine design. The present invention can be advantageously employed in those devices to provided virucidal properties and to prevent microbial growth within the filters. However, the present invention is especially attractive when added to conventional vacuums where it will provide many if not all of the advantages enjoyed by the specialized HEPA-filtered units. For these purposes special vacuum cleaner bags embodying the present invention can be produced. FIG. 3 shows a vacuum cleaner containing a vacuum bag constructed from a filter of the present invention FIG. 4 shows a diagrammatic representation of a cross section of such a vacuum bag 10'. The single paper layer of most vacuum bags is replaced by a multilayer structure. An inner layer 32 of nonwoven fabric protects an iodine source layer 34 composed of filter paper similar to that commonly used in vacuum bags. The source layer 34 is impregnated with iodine; a fine mesh 36 of iodine saturated material may optionally be laminated to the source layer 34 to increase the iodine capacity of the filter. Over this is laminated a relatively thick iodine trap layer 38. The trap layer 38 consists of relatively porous PVAcetal so that it does not overly impede air passage (i.e., strain the vacuum motor). The thickness is provided to ensure adequate air contact and iodine trapping. Like the air filter of FIG. 2 color change of the trapping layer 38 indicates exhaustion of the filter although proper selection of the components will generally result in the vacuum bag becoming filled with dirt before exhaustion occurs.

In one test of this vacuum bag version of the present invention a shop vacuum cleaner was operated as usual to vacuum a garage floor. Nutrient agar plates were exposed to air flowing from the exit port of the vacuum for 60 sec. The exposed plates were incubated at 37° C. for 24 hr. Each plate contained over 400 colonies of assorted bacteria and fungi. Addition of a prototype of the present invention constructed from extremely porous PVAcetal reduced the colony count to below 100. Significantly, there was no pronounced iodine odor in the exiting air.

This same approach can be readily adapted to a protective face shield such as one used by a surgeon. Here the invention serves a dual function: it prevents any microorganisms in the surgeons breath from reaching the patient; at the same time if prevents pathogens in the patient or in accidentally created blood aerosols from reaching the surgeons lungs. A typical surgical mask loses its effectiveness when it becomes saturated with moisture. The iodine-based filter continues to disinfect even when wet.

Many alterations and modifications may be made by those having ordinary skill in the art without departing from the spirit and scope of the present invention. The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself. The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope and spirit of the invention. The illustrated embodiment has been set forth only for the purposes of example and that should not be taken as limiting the invention. Therefore, it is to be understood that, within the scope of the appended claims, the invention may be practiced other than as specifically described herein.

I claim:

1. A disinfecting air filter comprising:
   an air permeable iodine source layer impregnated with elemental iodine for adding iodine vapor to air passing through; and
   an air permeable iodine capture layer of polyvinyl acetal polymer disposed to receive the air passing through said iodine source layer for removing iodine vapor from said air so that air exiting the iodine capture layer is substantially iodine-free.

2. The disinfecting air filter of claim 1 further comprising a particulate capturing layer disposed between the iodinating layer and the iodine capture layer.

3. The disinfecting air filter of claim 2, wherein the particulate capturing layer comprises a HEPA filter.

4. The disinfecting air filter of claim 1 further comprising a protective layer on the inlet side of the iodinating layer.

5. The disinfecting air filter of claim 1 further comprising a protective layer on the outlet side of the iodine capture layer.

6. The disinfecting air filter of claim 5 further comprising a visual indicator of saturation of the iodine capture layer.

7. The disinfecting air filter of claim 1, wherein the iodine capture layer further comprises a humidifying agent.

8. The disinfecting air filter of claim 7, wherein the humidifying agent is selected from the group consisting of polyethylene glycol, propylene glycol, ethylene glycol, and glycerol.

9. A disinfecting gas filter comprising:
   a gas permeable iodine source layer impregnated with elemental iodine for adding iodine vapor to a gas passing through; and
   a gas permeable iodine capture layer disposed to receive the gas passing through said iodine source layer for removing iodine vapor from said gas so that a gas exiting the iodine capture layer is substantially iodine-free.

10. The disinfecting air filter of claim 9, wherein the iodine-binding material is selected from the group consisting of anion exchange resin, ion exchange cellulose and poly vinyl acetal polymer.

11. The disinfecting air filter of claim 9, wherein the iodine-binding material is selected from the group consisting of anion exchange resin, ion exchange cellulose and poly vinyl acetal polymer.

12. The disinfecting air filter of claim 11, wherein the anion exchange resin is selected from the group consisting of derivatized polystyrene, derivatized cross-linked dextran polymer and derivatized agarose polymer.

13. The disinfecting air filter of claim 9, wherein the particulate capturing layer comprises a HEPA filter.

14. The disinfecting air filter of claim 9 further comprising a protective layer on the inlet side of the iodinating layer.

15. The disinfecting air filter of claim 9 further comprising a protective layer on the outlet side of the iodine capture layer.

16. The disinfecting air filter of claim 9 further comprising a visual indicator of saturation of the iodine capture layer.

17. The disinfecting air filter of claim 9, wherein the iodine capture layer further comprises a humidifying agent.

18. The disinfecting air filter of claim 17, wherein the humidifying agent is selected from the group consisting of polyethylene glycol, propylene glycol, ethylene glycol, and glycerol.

19. The disinfecting air filter of claim 9, wherein the filter forms a surgical mask.

20. The disinfecting air filter of claim 9, wherein the filter forms a vacuum cleaner bag.

* * * * *

US006036738C1

(12) EX PARTE REEXAMINATION CERTIFICATE (5102nd)
United States Patent
Shanbrom

(10) Number: US 6,036,738 C1
(45) Certificate Issued: Apr. 26, 2005

(54) DISINFECTING GAS FILTERS

(75) Inventor: Edward Shanbrom, Santa Ana, CA (US)

(73) Assignee: Shanbrom Technologies LLC, Ojai, CA (US)

Reexamination Request:
No. 90/006,398, Oct. 10, 2002

Reexamination Certificate for:
Patent No.: 6,036,738
Issued: Mar. 14, 2000
Appl. No.: 09/001,341
Filed: Dec. 31, 1997

(51) Int. Cl.⁷ .................................................. B03C 3/32
(52) U.S. Cl. ................ 55/524; 55/DIG. 2; 55/DIG. 35; 96/58; 96/63; 96/66; 96/69
(58) Field of Search .............................. 96/58, 63, 66, 96/69; 55/487, 524, DIG. 2, DIG. 25; 422/120; 424/404, 405

(56) References Cited

U.S. PATENT DOCUMENTS 5,071,648 A   12/1991  Rosenblatt ............... 424/78.06
5,074,997 A   12/1991  Riley et al. ................. 210/97
5,441,741 A    8/1995  Cheong ...................... 424/402
5,639,452 A    6/1997  Messier ..................... 424/78.1

FOREIGN PATENT DOCUMENTS

GB           813531      5/1959
WO       WO 94/20087    9/1994

OTHER PUBLICATIONS

"Ion Exchange Chromatography, Principles and Methods", 1982, pp. 1–71, Pharmacia Fine Chemicals AB, Uppsala, Sweden.

*Primary Examiner*—Robert A. Hopkins

(57) ABSTRACT

An improved disinfecting air filter that can be used to disinfect air or other gases. The invention can be advantageously used as a standalone to control microorganisms or used with a traditional HEPA filter to effectively control all microorganisms as well as dust particles. The device contains an iodine-donating filter disposed to dispense an effective quantity of iodine vapor into the gas or air stream to be filtered. The iodine laden air then passes through a porous filter of polyvinyl acetal polymer which material has an unusual affinity for iodine and effectively removes it leaving disinfected and iodine-free air gas.

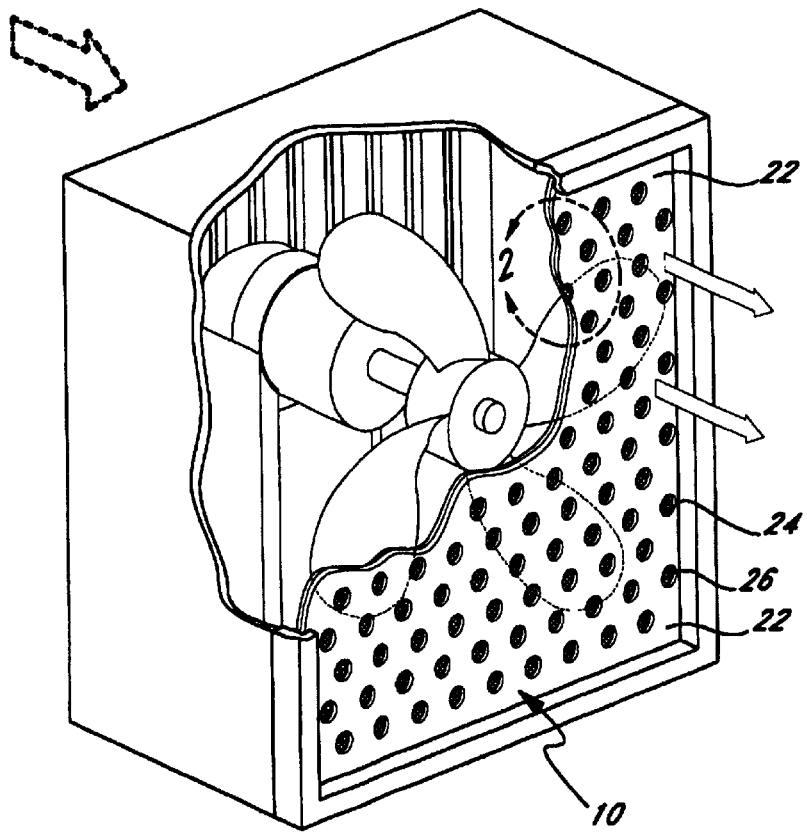

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–8 is confirmed.

Claims 11 and 12 are cancelled.

Claims 9, 10 and 13 are determined to be patentable as amended.

Claims 14–20, dependent on an amended claim, are determined to be patentable.

9. A disinfecting gas filter comprising:

a *layer of* gas permeable iodine source [layer] *material* impregnated with elemental iodine for adding iodine vapor to a gas passing through; and a *layer of* gas permeable iodine capture [layer] *material selected from the group consisting of derivatized cross-linked dextran polymer, derivatized agarose polymer, ion exchange cellulose and polyvinyl acetal polymer* disposed to receive the gas passing through said iodine source [layer] *material* for removing iodine vapor from said gas so that a gas exiting the iodine capture [layer] *material* is substantially iodine-free.

10. The disinfecting air filter of claim 9, wherein the [iodine-binding] *iodine source* material is selected from the group consisting of anion exchange resin, ion exchange cellulose and [poly vinyl] *polyvinyl* acetal polymer.

13. The disinfecting air filter of claim 9[, wherein the] *further comprising a HEPA particulate capturing* [layer comprises a HEPA] filter.

* * * * *